United States Patent [19]

Lenko et al.

[11] Patent Number: 4,915,478

[45] Date of Patent: Apr. 10, 1990

[54] LOW POWER LIQUID CRYSTAL DISPLAY BACKLIGHT

[75] Inventors: Daniel S. Lenko, Monrovia; Wayne R. Grine, Crownsville, both of Md.

[73] Assignee: The United States of America as represented by the Secretary of the Navy, Washington, D.C.

[21] Appl. No.: 254,552

[22] Filed: Oct. 5, 1988

[51] Int. Cl.$^4$ .............................................. G02F 1/133
[52] U.S. Cl. .................................. 350/338; 350/339 D; 350/345
[58] Field of Search .................... 350/345, 338, 339 D; 362/800

[56] References Cited

U.S. PATENT DOCUMENTS

| | | | |
|---|---|---|---|
| 4,059,916 | 11/1977 | Tachihara et al. | 350/345 X |
| 4,329,625 | 5/1982 | Nishizawa et al. | 362/800 X |
| 4,415,236 | 11/1983 | Perregaux | 350/339 D |
| 4,451,871 | 5/1984 | Kirkley et al. | 362/800 X |
| 4,487,481 | 12/1984 | Suzawa | 350/345 |
| 4,630,895 | 12/1986 | Abdala, Jr. et al. | 350/345 |
| 4,641,925 | 2/1987 | Gasparaitis et al. | 350/345 |
| 4,659,183 | 4/1987 | Suzawa | 350/345 |

FOREIGN PATENT DOCUMENTS

83/03013 9/1983 PCT Int'l Appl. ................. 350/345

Primary Examiner—Stanley D. Miller
Assistant Examiner—Anita Pellman Gross
Attorney, Agent, or Firm—Kenneth E. Walden; Jacob Shuster

[57] ABSTRACT

A liquid crystal display panel having a backlight for providing high brightness, uniformity of illumination intensity, high efficiency, and long battery life, and which can be manufactured at a low cost. The display device includes a liquid crystal display panel, a light source for illuminating the liquid crystal panel, a light passage member which can be formed of a transparent material disposed between the liquid crystal panel and the light source. The light source inlet side of the light passage member is formed with a recess with the thickness being reduced at the region diametrically opposed to the light source. A light reflecting member reflects light from the light source. Within the photoconductor, two or more of the wedged shaped photo conductor can be used for increased area of coverage.

1 Claim, 1 Drawing Sheet

LOW POWER LIQUID CRYSTAL DISPLAY BACKLIGHT

BACKGROUND OF THE INVENTION

The present invention relates to a liquid crystal display device (LCD) and more particularly, to a backlight illumination unit for the LCD.

In a liquid crystal display, a light is applied to a display member from the back side of the display member where there is not sufficient ambient light impinging onto the front for viewing the display on the device. An observer sees the transmitted through light as displayed information.

For backlighting, a luminous member is located behind the liquid crystal display member. The luminous member generates light which is applied to the back of liquid crystal display member and an observer sees the displayed information as bright and dark regions illuminated by light transmitted through liquid crystal display member. The liquid crystal display member selectively allows portions of display member to transmit light whereas other portions of display member are opaque and prevent transmission of light. When liquid crystal display devices are used in toys, watches, and other portable battery powered devices, it is necessary to provide an illumination device which is operable for long periods of time, which has a relatively large panel area, and which is electrically power efficient.

A liquid crystal display device having a backlight unit with a small lamp has been employed for wristwatches. The backlight for such a wristwatch display is used to illuminate the face of the watch to make it possible to read the time at night. Conventional types of backlights for liquid crystal display devices are not fully satisfactory in brightness, illumination intensity uniformity, and long battery life.

A relatively large amount of electrical power is needed to provide energy to the luminous member, at least a much larger amount than necessary to power the LCD itself. Thus the power needed to drive a luminous member is of considerable importance. Even if this power consumption is reduced to less than 1 watt, the power used to backlight liquid crystal display member is not neglegible, especially where dry cell batteries are used as the power source, battery life is significantly shortened as a result of the power used to drive the luminous member.

Accordingly, there is a need to increase the battery life of a portable liquid crystal displays using backlighting for viewing situations where there is insufficient ambient light to produce a viewable display. It is also desirable to improve the efficiency of the backlight as well as the uniformity of the illumination in order to reduce battery drain.

SUMMARY OF THE INVENTION

A liquid crystal display device includes a liquid crystal display panel, a light source for illuminating the liquid crystal panel, a light passage member made of one of transparent material with the light passage member being disposed between the liquid crystal panel and the light source, and a light reflecting member with the light passage member having an opening facing the liquid crystal panel to direct light to the rear side of the LCD panel. The light reflecting member is disposed on a surface of the light passage member to scatter light passing therethrough. The light passage member is wedge shaped so that the length of the light path between the light source and the exposed surface portion is uniform throughout the light passage member.

The light passage member can be made of a transparent plastic and the reflecting member can be a matted material which is highly reflecting, but diffused, such as paper, plastic or paint adhered to the appropriate surface portions of the light passage member. In one embodiment, all surfaces except for the light output surface are covered with the diffused reflecting material.

Accordingly, it is an object of the invention to provide an improved backlighting device for a liquid crystal display.

It is a further object of the invention to provide an improved liquid crystal display device including a backlighting unit.

It is another object of the invention to provide a liquid crystal display device with an improved backlight unit for providing uniform illumination intensity and long battery life.

Further objects and advantages of the present invention will become apparent as the following description proceeds and features of novelty characterizing the invention will be pointed out with particularity in the claims annexed to and forming a part of this specification.

DESCRIPTION OF THE DRAWINGS

For a better understanding of the present invention reference may be had to the accompanying drawings wherein.

DESCRIPTION OF THE PREFERRED EMBODIMENTS

Figure 1A:
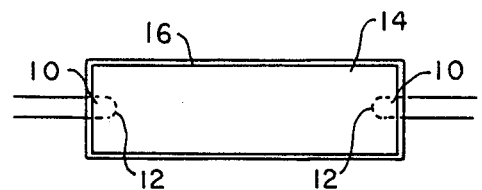
FIG. 1 shows a representative side and top view of the backlight device of the present invention.
Figure 1B:
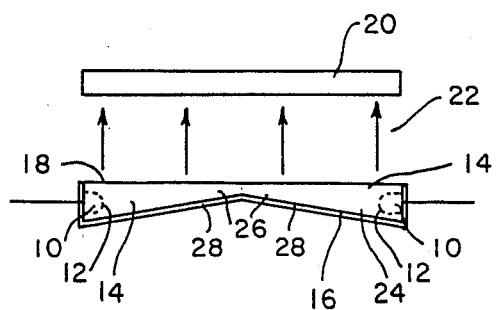

One embodiment of a liquid crystal display device including an illuminating backlight is constructed and arranged in accordance with the invention is shown in FIG. 1. A light emitting source 10 is inserted into a recess 12 formed in a photoconductor or light passage member 14 which is covered on one or more sides by a light scattering and reflecting element 16 facing an upper surface (light output surface) 18 of photoconductor 14 being uncovered for illuminating a liquid crystal panel 20.

If photoconductor 14 had a uniform thickness, the intensity of light would be decreased in inverse proportion to the square of the distance from light source 10 to panel 20 for the various light paths. In other words, if photoconductor 14 is uniform in thickness, the intensity of the backlight is higher at positions closer to light source 10 and is lower at positions further from light source 10. Accordingly, parts closer to light source 10 would be viewed with a higher contrast and parts further from light source 10 would have a lower contrast. In view of this fact, the thickness of photoconductor 14 is decreased as the distance from light source 10 increases.

Thus, the illumination intensity of backlight beam 22 corresponds distance travelling by light emitted by source 10 and scatter and reflected by reflector 16. For this reason, photoconductor 14 is made thinner at light scattering and reflecting element region 26 distal from light source 10 so that the intensity of backlight beam 22 farther from light source 10 approaches that of backlight beam 22 closer to light source 10.

In order to accomplish this, the bottom 28 of photoconductor 14 slopes in a straight line from one side of the photoconductor 14 towards the distal end. As a result, the intensity of backlight beam 22 farther from light source 10 is substantially equal to that of backlight beam 22 closer to light source 10. Accordingly, when liquid crystal panel 20 is illuminated by backlight beams 22, the brightness and contrast produced are substantially uniform throughout the area of the panel illuminated by photoconductor 14. For best results the panel 20 should abuttingly engage upper surface 18.

Conservation of power supply power is of substantial importance for portable battery powered devices. In this regard, the present invention includes two features. The first feature is the dual wedge portions 14 as shown in FIG. 1. For a large display 20, rather than have only one wedge with a single light source 10, a dual light source 10 is used with dual wedge sections. This arrangement permits increased intensity of illumination while still accommodating a larger display area. Additionally, it is more economical from a power drain standpoint to use two light sources 10 for a pair of wedges 14 instead of one larger wedge 14 with one brighter light source 10.

Secondly, the pair of light sources 10 and the circuit connecting said light sources substantially reduces power usage for the light intensity provided. Incandescent bulbs provide adequate lighting but require substantial power for operation. Typically, hand-held portable equipment often operate at voltages greater than or equal to five volts. High efficiency light emitting diodes (LED) provide new high efficiency and low power devices which provide good illumination at current levels of 2 milliamperes (ma) instead of the 20 ma required for incandescent lamps.

In the exemplary embodiment the LED's can be any appropriate color, e.g., red, yellow and green. However, for military purposes, where night vision infrared spotting is an important consideration a green colored LED would emit minimal infrared radiation for detection by an enemy.

Figure 2:
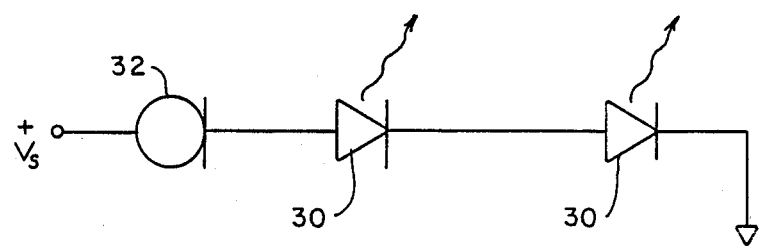
FIG. 2 is a schematic of the electrical circuit used in connection with the backlight device of FIG. 1.

Referring now to FIG. 2, there is shown the electrical schematic for the light sources 10. LED's 30 which correspond to the respective light sources 10 are connected in series for a forward voltage drop across each LED of 1.9 volts. A two lead constant current regulator 32 assures that the LED current is limited to 2 ma which is sufficient for securing light emittance from the LED's 30 with the minimum of current drain for the given light output.

The photoconductor 14 can be made of any appropriate transparent material such as glass or acryl material and in the present embodiment is made of plexiglass in which the LED's are mounted and forms an optical coupling to the LCD device. In the present embodiment, reflector 16 is a matted but highly reflecting material such as non-shiny white paper or green paper to match a green LED, and is secured by glue or the like to the angled faces of the plexiglass which add to the uniformity in the backlight diffusion. In the exemplary embodiment, reflector 16 is disposed on all surfaces except for light output surface 18. In a like manner, appropriately colored plastic or paint can be used for reflector 16.

While there has been illustrated and described what is at present considered to be a preferred embodiment of the present invention, it will be appreciated that numerous changes and modifications are likely to occur to those skilled in the art and it is intended in the appended claims to cover all those changes and modifications which fall within the true spirit and scope of the present invention.

What is claimed is:

1. A liquid crystal display of the backlighting type comprising: a panel having a front view surface and a rear surface, a light passage member gradually reducing in thickness from spaced light input portions at opposite ends thereof and bounded by a light output surface and a light reflecting surface, a semiconductor light source comprising a battery source of voltage above a minimum level and two light emitting diodes disposed at the light input portions from which light enters into the light passage member, at an effective illumination level and light reflective means disposed at and attached to the light reflecting surface for diffusing and reflecting the light at said effective illumination level toward the light output surface with generally uniform distribution of illuminating intensity, said light reflecting surface being angled with respect to and facing the light output surface, said diffused and reflected light at the effective illumination level exiting the light output surface on the rear surface of the panel, the improvement residing in current regulator means electrically interconnecting the light emitting diodes in series with the battery source for generation of said light at the effective illumination level by constant current conducted through the light emitting diodes with minimum drain of the battery source while maintained thereby above the minimum voltage level.

* * * * *